W. A. SCHMIDT AND L. BRADLEY.
APPARATUS FOR ELECTRICAL TREATMENT OF GASES.
APPLICATION FILED JUNE 24, 1916.
1,329,859. Patented Feb. 3, 1920.
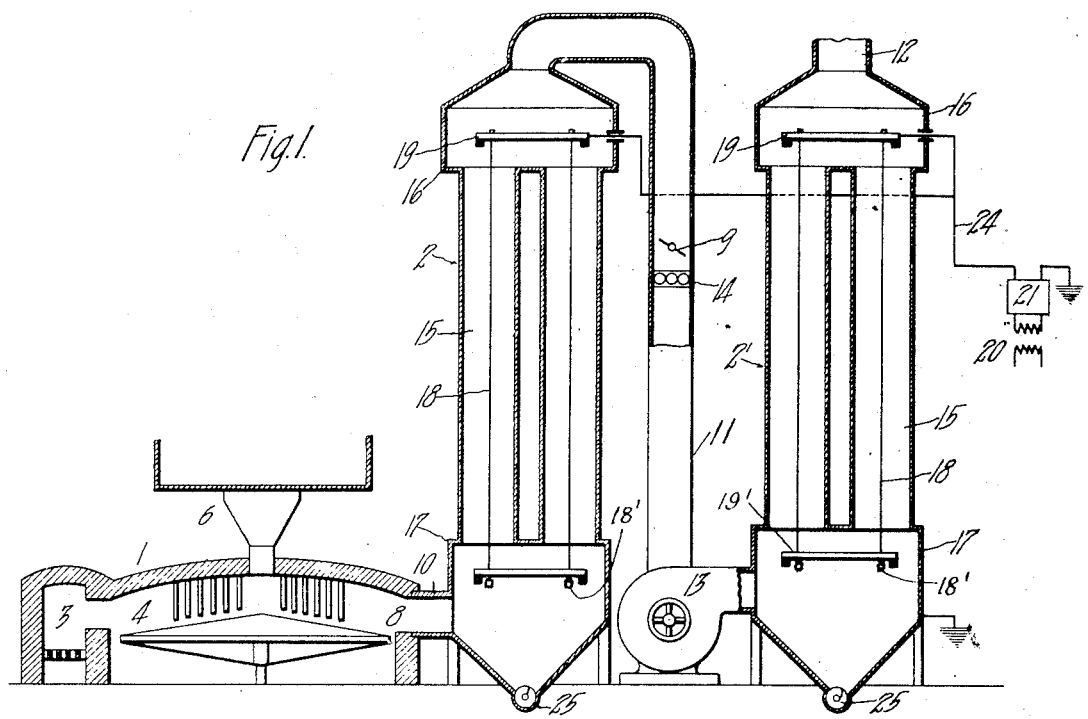
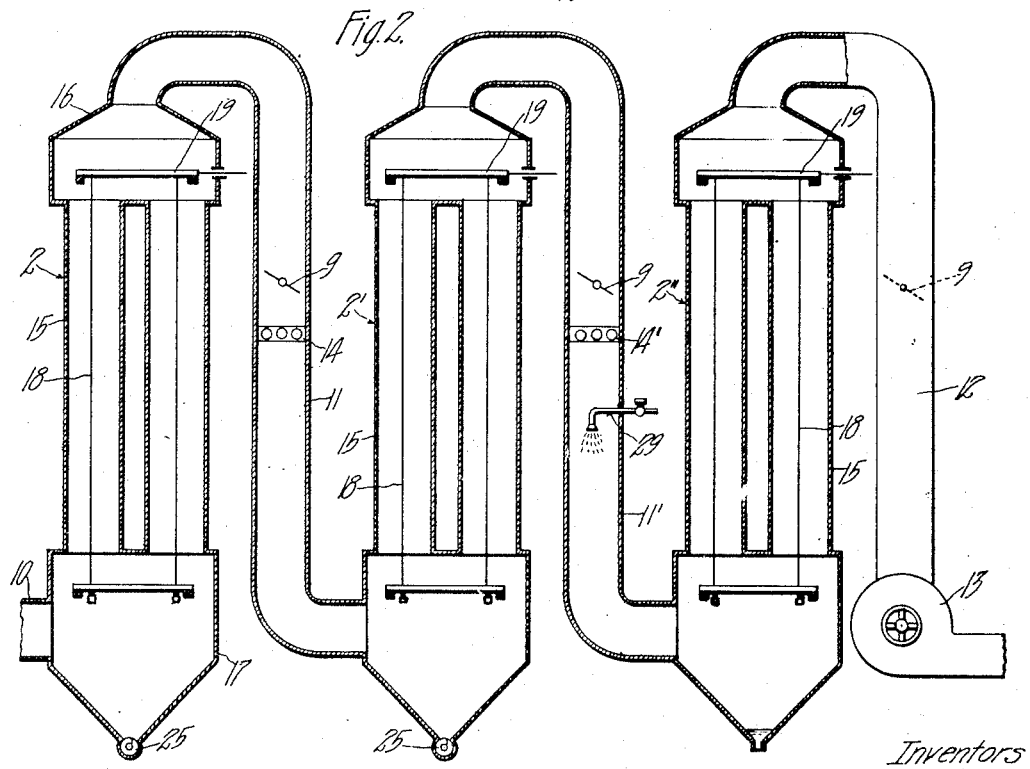
Inventors
Walter August Schmidt
and Linn Bradley
by Arthur P. Knight
their Attorney.

UNITED STATES PATENT OFFICE.

WALTER AUGUST SCHMIDT, OF LOS ANGELES, CALIFORNIA, AND LINN BRADLEY, OF EAST ORANGE, NEW JERSEY, ASSIGNORS TO RESEARCH CORPORATION, OF NEW YORK, N. Y., A CORPORATION OF NEW YORK.

APPARATUS FOR ELECTRICAL TREATMENT OF GASES.

1,329,859.      Specification of Letters Patent.      Patented Feb. 3, 1920.

Original application filed July 23, 1914, Serial No. 852,584. Divided and this applicaton filed June 24, 1916. Serial No. 105,767.

*To all whom it may concern:*

Be it known that we, WALTER AUGUST SCHMIDT and LINN BRADLEY, citizens of the United States, residing, respectively, at Los Angeles, in the county of Los Angeles and State of California, and at East Orange, in the county of Essex and State of New Jersey, have invented a new and useful Apparatus for Electrical Treatment of Gases, of which the following is a specification.

This application is a division of our application Ser. No. 852,584, filed July 23, 1914, now Patent No. 1,204,906, for method and means for recovering certain constituents from gases.

The present invention relates to an apparatus for subjecting gases to the action of an electric discharge or of an electric field, for the purpose of precipitating suspended particles therefrom, or for other purposes.

The main object of the present invention is to provide improved apparatus for such electrical treatment of gases, and particularly to provide improved means for conducting the gas through the electrical field, and for controlling the temperature, humidity and pressure of the gas in passing through the electrical field.

The accompanying drawings illustrate embodiments of our invention, and referring thereto:

Figure 1 is a vertical section of an apparatus suitable for use in connection with the recovery of arsenic or other condensable constituents from the flue-gases of an ore roaster, this apparatus being adapted to perform two successive precipitations, for removal, successively, of the solid suspended dust and of the condensable constituent.

Fig. 2 is a vertical section of a precipitating apparatus adapted for use where a plurality of condensable constituents are to be precipitated and recovered separately.

Referring to Fig. 1, the apparatus therein shown comprises a roaster or furnace 1, for roasting or heating the flue dust, ore or other material, means for conducting away the gases from such roaster or furnace, and a plurality of precipitating devices 2 and 2' connected to receive such gases and adapted to perform successive precipitating actions thereon. The furnace or roaster may be of any usual or suitable construction, comprising, for example, a combustion chamber 3 and a mechanical roaster chamber 4, to which the ore, flue dust or other material in a divided condition, is supplied by a hopper or feed means 6.

Suitable pipe connections 10, 11 and 12 are provided for leading the gases from the outlet 8 of the furnace or roaster successively through the precipitators 2 and 2', and from the last precipitator to any suitable flue or stack, a blower 13 being provided at any desired point in such connections for drawing or forcing the gases through the precipitators. A damper 9 is provided in pipe 11 for regulating the intensity of draft, and valved air-inlet means 14 is provided for admitting cool air from the outside to this pipe, so as to properly control the temperature.

Each precipitator comprises a suitable casing or chamber, formed for example, as a series of pipes 15, connected to top and bottom manifolds or headers 16 and 17, and collecting and discharge electrodes are provided in each precipitator, the pipes 15, for example, constituting the collecting electrodes, and the discharge electrodes consisting of fine wires 18 suspended from insulated supports 19, and tensioned by weights 18' at their lower ends. An insulated spacing frame 19' may be provided for retaining wires 18 in position. Connections are made to said electrodes from a source of high tension unidirectional current, for example, a step-up transformer 20 and a rectifier 21 connected therewith, said rectifier and the collecting electrodes having ground connections and the high tension side of the rectifier being connected by a wire 24 to the supports 19 for the discharge electrodes 18. Suitable means 25 are provided at the bottom of each precipitator, for recovering and discharging the precipitated substance.

The following example will serve to illustrate the operation of the above described apparatus as applied to metallurgical work. In roasting certain ores, having a high arsenic content, gases are given off which contain, among other constituents, the products of combustion, which in most cases will be high in sulfur dioxid, nitrogen, etc., and large quantities of arsenic in the form of volatilized arsenious oxid, which in many cases will be valuable for recovery, if it can be recovered comparatively pure. The gases passing from the roaster also carry large quantities of dust suspended therein and the presence of this dust interferes with recovery of the arsenic in pure condition from the gases, as it tends to contaminate the arsenic product. Our invention provides for recovery of the arsenic, substantially free from contamination by flue-dust, in the following manner;

The ore is heated or roasted in the furnace or roaster 1 and the arsenic content of the ore is thereby carried off, in the form of arsenious oxid, in the gases which pass from the roaster to the first precipitator 2, together with the other products of combustion and with the dust carried over mechanically by the gases. The gases are delivered to the first precipitator at a temperature sufficiently high to maintain the arsenic in a volatilized condition, and such temperature is maintained while the gases are passing through the first precipitator. A sufficient potential difference is maintained between the electrodes of this precipitator, to produce ionization and discharge at the discharge electrodes 18, with the result that the dust particles suspended in the gases are charged and are forced by the action of the electric field between the electrodes to travel toward the collecting electrodes, on which they are precipitated, the dust so precipitated being removed from the electrodes from time to time in any suitable manner. This operation leaves the gases in clean condition, as far as any solid or liquid particles are concerned, and the clean gases then pass through the pipe 11, wherein they are cooled by any suitable means, for example, by admitting cool air from the outside, through the ports or valved inlets 14, so as to reduce the temperature of the gases below the condensation or sublimation point of the arsenic, which then condenses in a fume or cloud of suspended particles. The gases, with the fume of arsenic suspended therein, are then forced by the blower 13 to the second precipitator 2' wherein the arsenic fume is precipitated by electrical action in a manner similar to the action in precipitator 2 as above described and is recovered substantially free from dust, this precipitated arsenic being removed from the collecting electrodes and from the casing of the precipitator either continuously or from time to time, by any suitable means.

In the above described apparatus the manifolds or headers 16 and 17 are shown as extending laterally beyond the vertical pipes or flues 15, so that the insulated supports are spaced from the walls of the headers sufficiently to permit electrical discharge between these parts. The stack or outlet 12 is mounted or supported directly on the upper manifold or header 16 of treater 2' and is of a cross-section less than the total cross-section of flues 15 of said treater, so that there is sufficient constriction at the outlet of treater 2' to enable a condition of appreciable pressure to be maintained within the treater, by the operation of the blower 13, while at the same time, said blower draws the gas from treater 2 so as to maintain a condition of suction in said treater. This apparatus therefore provides for electrical treatment of the gas at a relatively low pressure, followed by treatment at a higher pressure, and this increase of pressure may serve to control the condensation of a gaseous constitutent. After the gas has been subjected to electrical action in the first treater so as to precipitate any material suspended therein, it may be subjected to a greater pressure in the second treater, the temperature being at the same time lowered, if necessary, so as to condense a readily condensable constituent in the gas, partly or wholly by the effect of such increased pressure, and the resulting liquid or solid particles are then precipitated by the action of the electrical field in the second treater.

The apparatus above described provides for subjecting the gases to two successive precipitating actions, and any desired number of treaters may be included in series in this way to operate successively on the gas. In carrying out a three stage operation, the apparatus shown in Fig. 2 may be used, the pipe 10 in this case leading from the roaster or furnace flue to the first precipitator, and the several precipitators 2, 2', and 2'' being connected in series by suitable piping, a blower 13 being provided for forcing or drawing the gases through the apparatus. In some cases, for example in the case of sulfuric acid precipitation, it may be desirable to humidify the gases to facilitate the condensation, and for this purpose the pipe 11' between the second and third precipitating devices may be provided with water supply means 29 for spraying water into the gas, as well as with the air-admission means 14'. In some cases the cooling may be effected by liquid spray alone without air admission, or it may be effected by other means. In the operation of this apparatus, the dust or solid or liquid suspended matter passing into the apparatus from the roaster or furnace is first precipitated by the action of the first precipitator 2, the gases are then cooled by admission of air in the piping 11' so as to condense the second condensate, for example, sulfuric acid, which is then precipitated by electrical action in the third precipitator 2''. The sulfuric acid may be drawn off from this precipitator, for use, but in some cases the object of the removal of the sulfuric acid from the gases may be only to avoid its presence in the effluent to the atmosphere.

The apparatus shown in Fig. 2 may, for example, be applied to the treatment of gases from a roasting furnace which contains two components which it is desired to remove, such as arsenious acid and sulfuric acid. As applied to the treatment of gases with this material, the dust or solid or liquid suspended matter passing into the apparatus from the roaster or furnace is precipitated by the action of the first precipitator 2. The gases are then cooled by admission of air through pipes 14 into pipe 11, the first condensation product, for example, arsenic, being thereby condensed and immediately thereafter precipitated in the second precipitator 2'. The exit gases from this precipitator are then further cooled by admission of water or water and air in the pipe 11' so as to condense the second condensate, for example, sulfuric acid, which is then precipitated by electrical action in the third precipitator 2''.

What we claim is:—

1. In an apparatus for electrical precipitation of suspended particles from gases, inlet and outlet manifold chambers, a plurality of pipes extending between said manifold chambers, discharge electrodes in said pipes and means in the lower chamber for collecting and withdrawing material deposited in said pipes.

2. In an apparatus for electrical precipitation of suspended particles from gases, a lower manifold chamber, an upper manifold chamber, a plurality of vertical pipes communicating at their lower ends with said lower manifold chamber and at their upper ends with the upper manifold chamber, an insulated support extending within said upper manifold chamber and a plurality of discharge electrodes hung from said support and extending respectively within said pipes.

3. An apparatus for electrical precipitation of suspended material from gases, comprising lower and upper manifold chambers, collecting electrodes consisting of vertical pipes connecting and communicating with said manifold chambers, said manifold chambers being provided with connections for maintaining flow of gases through said pipes, an insulated support mounted within the upper manifold chamber, discharge electrodes consisting of wires hung from said support and extending respectively within said pipes and into said lower manifold chamber, tensioning weights at the lower ends of said wires and insulated spacing-means within said lower manifold chamber for holding said discharge electrodes in spaced relation.

4. In an apparatus for electrical treatment of gases, a plurality of pipes each having substantially closed side-walls, manifold chambers at opposite ends of said pipes, insulated supports mounted within said manifold chambers and electrodes mounted on said insulating supports, said manifold chambers extending beyond the pipes so that said insulating supports are spaced from the walls of said manifold chambers.

5. In the art of electrical treatment of hot gases, the method which consists in spraying water into the gases to cool them, and then subjecting the gases to the action of an electrical field to precipitate suspended material therefrom.

6. In an apparatus for electrical treatment of gases, two gas-receiving means, each provided with electrodes for electrical action on the gas, gas-connections whereby said gas-receiving means are connected to receive the gas successively and blower-means between said gas-receiving means to maintain a condition of suction in one of said gas-receiving means and a condition of pressure in the other of said gas-receiving means.

7. An apparatus for electrical treatment of gases, comprising a gas-receiving means provided with electrodes for action on the gas and with means for admitting gas to said gas-receiving means and means for drawing gas from said gas-receiving means to maintain a condition of suction therein.

8. Apparatus for recovering certain constituents from gases comprising a plurality of devices for producing an electric discharge through the gas to precipitate suspended particles therefrom, means for conducting the gas successively through said precipitating devices and means interposed in the path of the gas between said precipitating devices for maintaining therein a difference of pressure.

9. Apparatus for recovering certain constituents from gases, comprising a plurality of devices for producing an electric discharge through the gas to precipitate suspended particles therefrom, means for conducting the gas successively through said precipitating devices and a blower interposed in the path of the gas between said precipitating devices for maintaining a relatively higher pressure in the second precipitator.

10. In an apparatus for electrical separation of certain constituents from gases, a plurality of gas-receiving means, means for passing the gas successively through said gas-receiving means, means for increasing the pressure of the gas as it passes from one gas-receiving means to the next gas-receiving means to control condensation of a gaseous constituent and to form particles suspended in the gas and electrical means in each of the said gas-receiving means for producing electrical fields therein to precipitate particles suspended in the gas.

WALTER AUGUST SCHMIDT.
LINN BRADLEY.